Oct. 1, 1940.    E. H. TAYLOR    2,216,606
METHOD OF MAKING SPIRAL PIPE
Filed Oct. 6, 1938    2 Sheets-Sheet 1

INVENTOR.
Edward Hall Taylor
BY
Crown, Jackson, Buttchu & Dienner
ATTORNEYS.

Oct. 1, 1940.  E. H. TAYLOR  2,216,606
METHOD OF MAKING SPIRAL PIPE
Filed Oct. 6, 1938    2 Sheets-Sheet 2
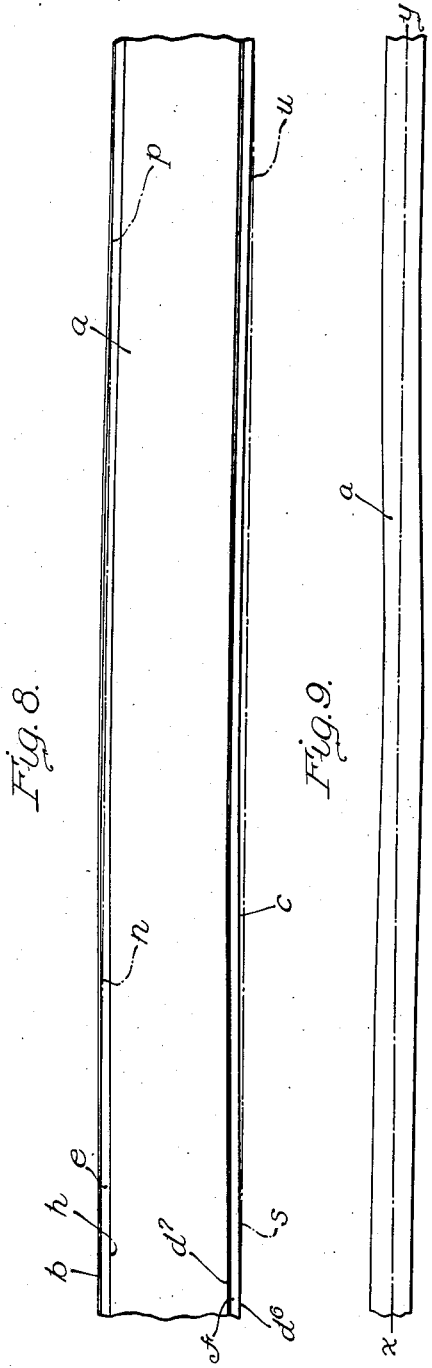
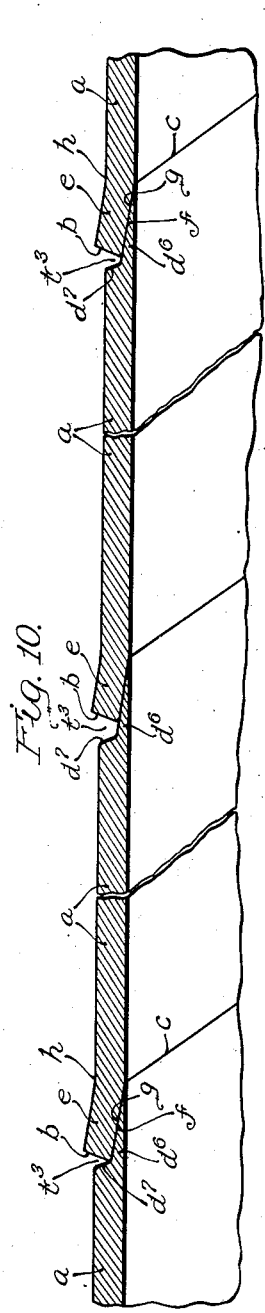
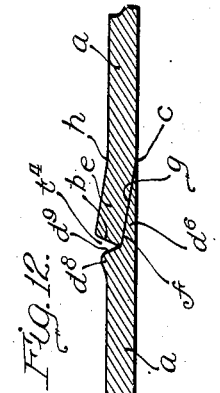
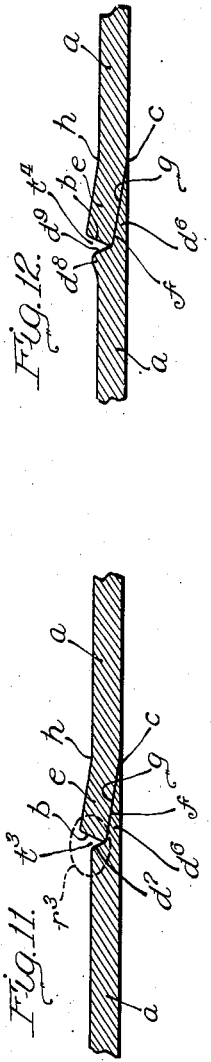
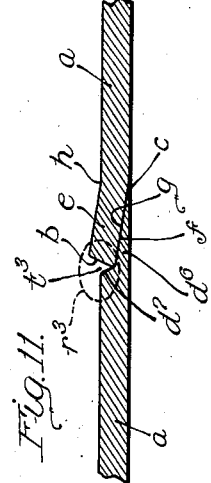
INVENTOR.
Edward Hall Taylor
BY
ATTORNEYS.

Patented Oct. 1, 1940

2,216,606

UNITED STATES PATENT OFFICE 2,216,606

METHOD OF MAKING SPIRAL PIPE

Edward Hall Taylor, Oak Park, Ill.

Application October 6, 1938, Serial No. 233,581

3 Claims. (Cl. 113—35)

This invention relates to spiral pipe produced from metal strip wound spirally and welded, one convolution to another, and has to do with a novel method for producing such pipe with expedition and facility.

It is known to produce spiral pipe by winding metal strip spirally into tubular form with the edge portions of the adjacent convolutions of the wound tubing in overlapping relation to provide lap joints, and to weld together the overlapping margins of the strip. In one method of producing spiral pipe in this manner, the underlap and the overlap of the joint are disposed parallel with the axis of the wound pipe, and the outer edge of the overlap is welded to the outer face of the pipe. Difficulty is encountered, in such a method, in controlling and restraining the fused metal during the welding operation, with the result that the welding has to be performed relatively slowly, with attendant danger of burning through the pipe adjacent the edge of the overlap, to assure, as far as possible, an efficient and tight weld.

Among the objects of my invention are the provision of metal strip of such character as to facilitate winding it spirally into tubular form, the provision of a well defined upwardly opening welding trough for reception of the weld metal effective to confine the molten metal laterally during the welding operation, the provision of adequate backing up metal beneath the weld to prevent burning through of the metal during the welding operation, adequate reinforcement of the formed pipe along the line of weld, and assurance that the marginal portions of the wound strip will lap sufficiently to provide an efficient joint while accommodating irregularities in the strip due to cambering thereof. Further objects and advantages of my invention will appear from the detail description.

In the drawings:

Figure 8 is a view on the same order as Figure 1, but showing a short length of a third modified form of metal strip and the camber thereof;

Figure 9 is an outer face semi-diagrammatic view of the same form of strip as is shown in Figure 8, but showing an increased length of strip and the lengthwise undulatory formation thereof due to cambering, the strip being shown in outline only;

Figure 10 is a fragmentary sectional view, on an enlarged scale and partly broken away, through the upper portion of an unwelded pipe formed from the strip of Figures 8 and 9;

Figure 11 is a sectional view through one of the joints of Figure 10, the weld being indicated by dotted lines; and Figure 12 is a sectional view on the order of Figure 11, showing a fourth modified form of strip, the weld not being indicated.

This application is a continuation-in-part of my co-pending application for Spiral pipe and method of making same, Serial No. 69,898, filed March 20, 1936.

With a view to simplifying the explanation of my invention, it will be first assumed, with reference to Figures 1 to 7, inclusive, that the metal strip is straight lengthwise. In practice, however, it is not straight, which creates certain difficulties to the solution of which my invention is directed, as will be explained more fully later on.

Figure 1:
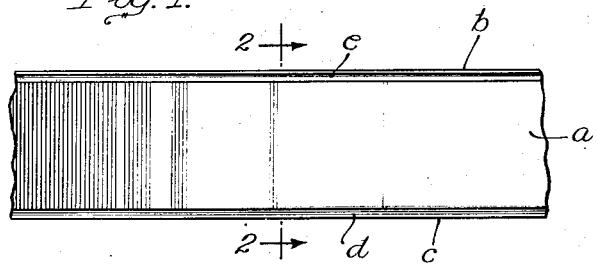
Figure 1 is a fragmentary outer face view of the improved metal strip which I employ.
Figure 2:
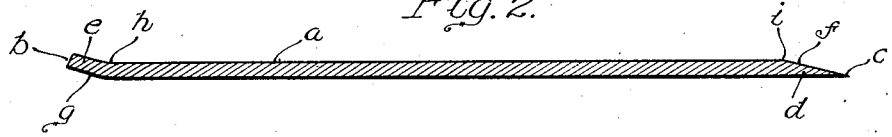
Figure 2 is a cross sectional view thereof, on an enlarged scale, taken substantially on line 2—2 of Figure 1.

Referring first to Figures 1 and 2, the metal strip is indicated at $a$, the lateral edges thereof being designated $b$ and $c$, of which $b$ is the following edge and $c$ the leading edge, with reference to winding of the strip spirally into tubular form.

In accordance with my invention, I preform the strip, by rolling or in any other suitable manner, so as to produce along the leading side thereof a marginal element $e$ and, along the following side of the strip, a marginal element $d$. Element $d$ is of triangular cross section and tapers in thickness to edge $c$ of the strip, outer surface $f$ of element $d$ being beveled from its inner edge toward edge $c$ of the strip, and being of considerable width. Element $e$ is formed by bending the marginal portion of strip $a$ outward at an angle such that the inner face $g$ of this element is inclined similarly to outer face $f$ of element $d$. Inner surface $g$ of element $e$ is somewhat narrower than outer surface $f$ of element $d$, element $e$ being of substantially uniform thickness corresponding to the body of strip $a$ and having its outer edge approximately perpendicular to its inner surface $g$, as shown in Fig. 2.

The inner edge $h$ of element $e$, at the outer surface of the latter, is uniformly spaced from the inner edge $i$ of outer surface $f$ of element $d$. This assures that the effective width of the convolutions, in the wound strip, will be uniform and that the internal surface of the ultimate pipe will be uniform. This, in conjunction with the beveled or inclined surfaces at the margins of the strip, which surfaces seat one upon the other when the strip is wound spirally into tubular form, is conducive to accurate winding of the strip with expedition and facility.

Figure 3:
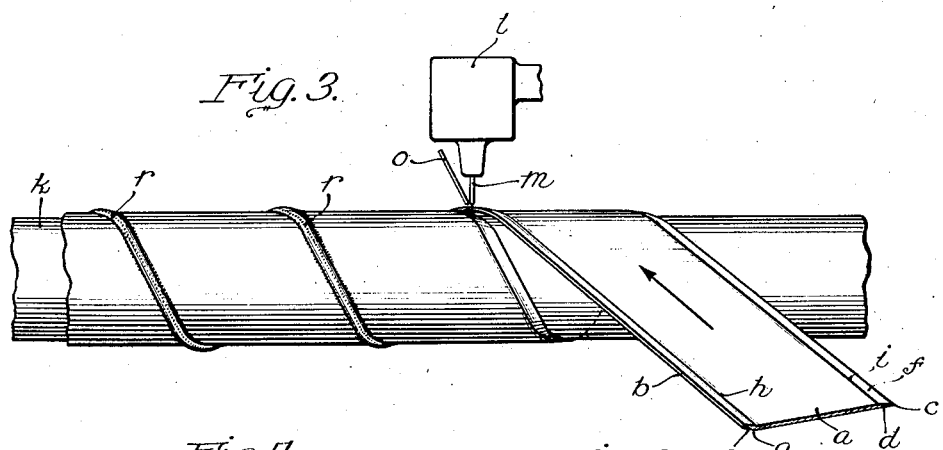
Figure 3 illustrates the manner of winding and welding the strip to form the spiral pipe.
Figure 4:
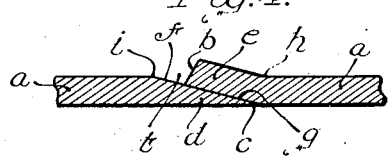
Figure 4 is a sectional view, on an enlarged scale, taken longitudinally of the pipe, showing the overlap of the convolutions before welding.

The winding operation is illustrated in Figure 3, where there is diagrammatically shown the rotating mandrel $k$, the welding head $l$ having the carbon welding electrode $m$, and a metal rod $o$ for providing weld metal. The metal strip $a$ is wound upon the mandrel $k$ as shown, in such manner that the inner surface $g$ of element $e$ of each convolution seats upon the outer surface $f$ of element $d$ of the next preceding convolution, edge $b$ of element $e$ being spaced from edge $i$ of element $d$ and defining therewith an upwardly opening welding trough $t$ of approximately V-shape, as shown in Figure 4. It will be noted that there is considerable thickness of metal beneath this trough, sufficient to provide backing up metal in amount effective to prevent, or reduce likelihood of, burning through the metal during the welding operation.

Figure 5:
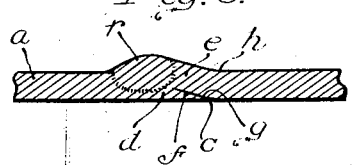
Figure 5 is a view similar to Figure 4 after welding.

During winding of strip $a$ upon mandrel $k$, the welding trough $t$ passes beneath electrode $m$ and the elements $d$ and $e$ are fused and welded together. At the same time metal from rod $o$ is welded into trough $t$ so as to fill the latter, this weld metal becoming integrally united with elements $d$ and $e$ of strip $a$. This provides a reinforcing element $r$ in the form of a rounded projection from the outer surface of the formed tubing or pipe and merging into elements $d$ and $e$ of the strip, as shown in Figure 5. This element $r$ materially reinforces the pipe along the line of weld, which thus becomes the area of maximum mechanical strength of the pipe. The upwardly opening trough $t$ effectively retains the molten metal during a considerable portion of the welding operation and is of material assistance in forming the reinforcing element $r$. This is conducive to performance of the welding operation at relatively high speed with corresponding increase in production, an important consideration in this art, while also assuring a highly efficient and tight weld, which is of primary importance.

Figure 6:
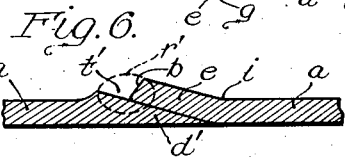
Figure 6 is a view similar to Figure 4 showing a modification the welding being indicated by dotted lines.

In the modified form shown in Figure 6, marginal element $d'$ of greater thickness, at its inner or base portion, than the body of strip $a$. The welding trough $t'$ more nearly approaches V-shape and increased thickness in backing metal at the bottom of the trough is provided. The reinforcing element formed by the weld metal is indicated by dotted lines at $r'$.

Figure 7:
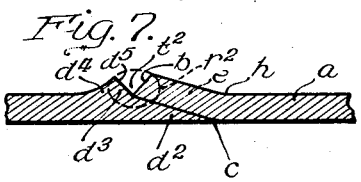
Figure 7 is a view similar to Figure 6 showing a second modification.

In the modification of Figure 7, the marginal element of the strip comprises the outer portion $d^2$ and the inner portion $d^3$. The outer portion $d^2$ corresponds substantially to element $d$ of Figure 4. The inner portion $d^3$ is materially thicker than the body $a$ of the strip, providing a rib $d^4$, of inverted V cross-section, projecting from the outside surface of the strip. Surface $d^5$ of this rib is disposed at an abrupt inclination relative to the outside surface of the portion $d^2$, and defines, with said latter surface, an obtuse angle. The outside surface of the portion $d^2$ is approximately equal in width to the inside surface of the element $e$, the edge of which is made to coincide with the apex of said obtuse angle, and the edge surface of which defines, with the surface $d^5$, the welding trough $t^2$. This trough $t^2$ is capable of retaining molten metal to a considerable depth, forming a reinforcing element indicated by the dotted line $r^2$.

It will be observed that in all forms shown edge $c$ of the underlap of the joint coincides with the inner edge of element $e$ of the metal strip, at the under or inner surface of the latter element, the interior surface of the formed pipe being uniform and smooth.

While I preferably deposit additional metal in the trough, from the rod $o$ or in any other suitable manner, with the attendant advantages above noted, this is not always essential. In certain cases the overlap of the joint may be in part fused by an arc from a carbon electrode, the heat of the arc sufficing to heat the overlap and the underlap to welding temperature and the fused parent metal from the overlap flowing into the trough, filling the latter either partially or completely, where it unites with the metal of the underlap and the remainder of the metal of the overlap. It will thus be seen that my invention, in certain aspects, is conducive to performing the welding operation by means of a carbon electrode and without adding weld metal, with expedition and facility. If, during this operation, the amount of metal of the overlap fused is in excess of that required to fill the trough, this excess metal will form a reinforcing element along the weld, as before, though to a less extent than where additional metal is welded into the trough. This method of welding will be clear from the drawings and preceding description, and need not be illustrated nor described in greater detail.

Metal strip intended for winding spirally into tubular form is commonly produced in considerable lengths by rolling. This rolled strip, due to the rolling operations to which it is subjected, is bowed or cambered transversely, and of undulatory formation lengthwise. That is objectionable as rendering it difficult to dispose the marginal portions of the strip, when wound spirally into tubular form, in such manner as to permit rapid and accurate welding together thereof while assuring tight joints of adequate mechanical strength. It is possible to avoid that difficulty by rolling the strip to greater width than desired and then trimming it to the desired width, removing sufficient metal to eliminate the cambering, the trimmed strip having straight parallel edges. Trimming the rolled strip to the desired width is, however, objectionable in that it necessitates a trimming operation and results in considerable waste metal, both of which add materially to the cost of production.

It is possible by my invention to wind the rolled strip, of undulatory formation lengthwise, spirally into tubular form and weld the marginal portions thereof together with expedition and facility, while assuring tight joints of adequate strength. In accordance with my invention, the metal strip $a$ is rolled to the desired width and may be of considerable length. In the rolling operations, this strip, due to various causes, is bowed or cambered transversely, in the general manner indicated in Figure 8, in which the transverse curvature of the strip will be apparent by reference to the straight parallel dot and dash lines $n$—$p$ and $s$—$u$, which may be considered as corresponding to the straight lateral edges of the strip shown in Figure 1. Due to this transverse cambering, the strip is of undulatory form lengthwise, as shown in Figure 9, in which the undulatory character of the strip will be apparent by reference to the straight dot and dash line $x$—$y$.

Referring to Figure 11, the strip of Figures 8 and 9 is provided, at its following edge, with a marginal portion defining an element $d^6$ of triangular cross-section, tapering to the adjacent edge of the strip. The base of elements $d^6$ is of less thickness than the body of strip $a$, which provides a shoulder $d^7$ inclined upward and outward from the outer face $f$ of element $d^6$, forming with face $f$ an obtuse angle. When the strip is wound spirally into tubular form element $e$ seats upon element $d^6$, with edge $b$ defining with shoulder $d^7$ a welding trough $t^3$, which receives the weld metal. If desired, weld metal may be used in amount to provide a reinforcing bead $r^3$, as before.

When the strip of Figures 8 and 9 is wound spirally into tubular form, the relation of element $e$ to shoulder $d^7$ will vary, due to the undulatory character of the strip. This is illustrated in Figure 10, showing the unwelded joints of a pipe formed from that strip. Considering these joints in order from left to right, the first joint is taken through the peak of a camber toward the leading edge of the strip, the second joint is taken through the valley or bottom of the same camber as the first joint, and the third joint is taken through a camber toward the following edge of the strip. It will be apparent that element $e$ of strip $a$ will contact shoulder $d^7$ at intervals, as the strip is wound spirally upon the mandrel $k$, being variably spaced from shoulder $d^7$ between the points of contact therewith. The shoulder $d^7$ thus serves as an abutment element and a guide for the strip in the winding thereof. Element $d^6$ extends a considerable distance beneath element $e$, even when edge $b$ of the latter element is spaced its maximum distance from shoulder $d^7$. That provides sufficient lap of the elements $d^6$ and $e$ to provide a seat therebetween of adequate area and assure an efficient joint, while also assuring adequate thickness of backing metal beneath the welding trough. The widths of elements $d^6$ and $e$, and the taper of element $d^6$ are properly related to the cambering of the strip, which is within known limits, to attain the results stated, element $d^6$ being of considerably greater width than the maximum extent of transverse camber of the strip.

The metal strip is wound upon mandrel $k$ under considerable tension, in a known manner, and the formed pipe is of uniform interior diameter corresponding to the diameter of the mandrel. Where element $e$ contacts shoulder $d^7$, as in the first joint of Figure 10 and in Figure 11, element $e$ seats for its full width upon outer face $f$ of element $d^6$. Where element $e$ is spaced away from shoulder $d^7$, the marginal portion of the strip, including element $e$, is more or less stretched or distorted slightly so that element $e$ seats tightly upon surface $f$ and may be, in effect, of decreased width, as in Figure 10. This effect, of decreased width of element $e$ is caused by stretching or reshaping of element $e$ under tension upon mandrel winding of the strip under tension upon mandrel $k$, the strip during winding being shaped conformably to the mandrel.

In the modified form of strip shown in Figure 12, the following edge of the strip is provided with a rounded bead $d^8$, at its outer surface, providing, with the contiguous portion of the body of the strip, a shoulder $d^9$ of greater height than shoulder $d^7$ of Figure 11. Shoulder $d^9$ defines, with edge $b$ of element $e$, a welding trough $t^4$ of greater depth than trough $t^3$ of Figure 11. Otherwise the strip of Figure 12 is similar to that of Figures 8 to 11, inclusive, and is spirally wound into tubular form and welded together along the welding trough, in the manner previously described.

It will be apparent, from what has been said with reference to Figures 8 to 11, inclusive, that, in practice, the metal strip of Figures 1 to 7, inclusive, is of undulatory formation lengthwise. The marginal elements of the latter strip are of proper width and formation to compensate for the cambering of the strip while assuring adequate seating area between the underlap and the overlap of the respective joints, as well as adequate thickness of metal beneath the welding trough, element $d$ or $d^2$ being, in each instance, of considerably greater width than the maximum extent of transverse camber of the strip.

I claim:

1. The method of producing tubing from metal strip by welding, which comprises forming one marginal portion of the strip to provide a solid marginal element of substantially tri-angular cross-section tapering to the edge of the strip and an integral rib projecting from the outside surface of said strip with its outer lateral surface extending from the base of said element, the outside surface of said element being inclined relative to the inside surface of said strip and extending from the base of said rib defining with said outer lateral surface of said rib an obtuse angle, said strip being otherwise of uniform thickness and the base of said element being substantially equal in thickness to said uniform thickness of said strip, bending the opposite marginal portion of the strip outward at an angle to correspond in width and inclination to the outside surface of said element, winding the strip spirally into tubular form with said last-named marginal portion seated upon the outside surface of said element to said rib, the edge surface of said last-named marginal portion and the outer lateral surface of said rib forming a trough, and welding said marginal portions together and filling said trough with weld metal.

2. The method of producing tubing from rolled metal strip having transverse camber and lengthwise undulatory side edges, imparted to it by the rolling operation, which comprises forming one marginal portion of the strip, while in its lengthwise undulatory condition resulting from rolling, to provide a solid marginal element of substantially triangular cross-section tapering to the edge of the strip with its outside surface inclined to the inside surface of said strip and of a width greater than the maximum transverse camber of said strip, bending the opposite marginal portion of the strip, while in its lengthwise undulatory condition resulting from rolling, outward at an angle to correspond substantially in inclination to the outside surface of said element, said outwardly bent opposite marginal portion having a maximum width less than the minimum width of the outside surface of said element, winding the strip spirally into tubular form with said opposite marginal portion seated upon the outside surface of said element and the outer edge of said opposite marginal portion spaced outward from the inner edge of said surface and defining with the inner portion of the latter a welding trough, and welding said outer edge of said opposite marginal portion to said element along said trough.

3. The method of producing tubing from rolled metal strip having transverse camber and lengthwise undulatory side edges, imparted to it by the rolling operation, which comprises forming one marginal portion of the strip, while in its lengthwise undulatory condition resulting from rolling, to provide a solid marginal element of substantially tri-angular cross-section tapering to the edge of the strip and a shoulder at the outside surface of said strip with its outer lateral surface extending from the base of said element, the outside surface of said element being inclined relative to the inside surface of said strip and extending from the base of said shoulder defining with said outer lateral surface of said shoulder an obtuse angle, bending the opposite marginal portion of the strip, while in its lengthwise undulatory condition resulting from rolling, outward at an angle to correspond substantially in inclination to the outside surface of said element, said outwardly bent opposite marginal portion having a maximum width substantially equal to but within the width of the outer surface of said element, winding the strip spirally into tubular form with said opposite marginal portion seating upon the outside surface of said element to said shoulder and the outer edge of said opposite marginal portion defining with said outer lateral surface of said shoulder a welding trough, and welding said outer edge of said opposite marginal portion to said shoulder along said trough.

EDWARD HALL TAYLOR.